(12) United States Patent
Brady

(10) Patent No.: US 7,979,748 B2
(45) Date of Patent: Jul. 12, 2011

(54) METHOD AND SYSTEM FOR ANALYZING MEMORY LEAKS OCCURRING IN JAVA VIRTUAL MACHINE DATA STORAGE HEAPS

(75) Inventor: Michael J. Brady, Gosford (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/756,508

(22) Filed: Apr. 8, 2010

(65) Prior Publication Data

US 2010/0192133 A1 Jul. 29, 2010

Related U.S. Application Data

(63) Continuation of application No. 11/679,725, filed on Feb. 27, 2007, now Pat. No. 7,743,280.

(51) Int. Cl.
*G06F 11/00* (2006.01)
(52) U.S. Cl. .......................................................... 714/38
(58) Field of Classification Search ........................ None
See application file for complete search history.

(56) References Cited

U.S. PATENT DOCUMENTS

| | | | |
|---|---|---|---|
| 6,167,535 A | 12/2000 | Foote et al. | |
| 7,313,661 B1 * | 12/2007 | Dmitriev | 711/159 |
| 7,325,106 B1 | 1/2008 | Dmitriev et al. | |
| 7,444,484 B2 | 10/2008 | Achanta et al. | |
| 2004/0107385 A1 | 6/2004 | Bates et al. | |
| 2005/0081190 A1 | 4/2005 | Betancourt et al. | |
| 2005/0091645 A1 | 4/2005 | Chilimbi et al. | |
| 2005/0289307 A1 | 12/2005 | Achanta et al. | |
| 2006/0253845 A1 | 11/2006 | Achanta et al. | |
| 2006/0265438 A1 | 11/2006 | Shankar et al. | |
| 2006/0277440 A1 | 12/2006 | Minshall et al. | |

OTHER PUBLICATIONS

United States Patent and Trademark Office, Office Action for U.S. Appl. No. 11/679,725, Sep. 15, 2009, pp. 1-9, Alexandria, VA, USA.
United States Patent and Trademark Office, Notice of Allowance for U.S. Appl. No. 11/679,725, Feb. 16, 2010, pp. 1-6, Alexandria, VA, USA.

* cited by examiner

*Primary Examiner* — Michael C Maskulinski
(74) *Attorney, Agent, or Firm* — Lee Law, PLLC; Christopher B. Lee

(57) ABSTRACT

A plurality of heap dump requests associated with an operating virtual machine (VM) program is received from a VM profiler interface module at a heap dump request processing module. In response to receipt of each heap dump request at the heap dump request processing module, a dynamic modifiable library identified within a dynamic modifiable configuration file is loaded into a memory, where the dynamic modifiable library comprises instructions associated with processing a current heap dump request. The instructions associated with processing the current heap dump request are executed. The dynamic modifiable library is unloaded from the memory. A plurality of heap dump files and a plurality of object movement event files generated by execution of the instructions are analyzed. A memory leak associated with the operating VM program is automatically identified based upon the analyzed plurality of heap dump files and the plurality of object movement event files.

24 Claims, 2 Drawing Sheets

METHOD AND SYSTEM FOR ANALYZING MEMORY LEAKS OCCURRING IN JAVA VIRTUAL MACHINE DATA STORAGE HEAPS

RELATED APPLICATIONS

This application is a continuation of and claims priority to and claims the benefit of U.S. patent application Ser. No. 11/679,725 titled "A METHOD AND SYSTEM FOR ANALYZING MEMORY LEAKS OCCURRING IN JAVA VIRTUAL MACHINE DATA STORAGE HEAPS," which was filed in the U.S. Patent and Trademark Office on Feb. 27, 2007, and which is incorporated herein by reference in its entirety.

TECHNICAL FIELD

This invention relates to analyzing memory leaks occurring in Java Virtual Machine (JVM) data storage.

BACKGROUND

This invention discloses a programming method and system that solves the problems existing in prior art techniques for analyzing and correcting memory leaks in large Java Virtual Machine (JVM) "heaps" in which data elements or objects are stored in a managed heap. The introduction of Java Virtual Machines (JVMs) incorporating memory space for storing computer program instructions and data to be processed by 64-bit central processing units (CPUs) makes it possible to significantly increase the number of addressable memory locations (or "memory space") and to increase the amount of data (or "heap size") capable of being processed using the JVM. For example, with a 64-bit CPU, it is possible to specify JVM heap sizes of over 4 Gigabytes (GB). Diagnosing an unanticipated accumulation of data objects in memory (or "memory leak") occurring as a result of JVM operations when it is utilizing a large heap size is not always possible with existing memory analysis tools (such as "hprof"), since such tools typically rely on obtaining a representation of data heap status using the "JVMPI" interface (Java Virtual Machine Profiler Interface) operated during "runtime" execution of the JVM program. The problem with this approach is that the JVMPI interface often cannot allocate sufficient memory to build such a "heap dump" representation when the heap size is large, and the JVM then ceases to function due to lack of remaining free memory and any possibility of analyzing the data heap to correct memory leaks that have occurred as a result of operation of the program is then lost.

Such an analysis is further complicated in cases where a memory leak occurs during actual operation of a "production" data processing system, due to the need to maintain an acceptable level of performance while the diagnosis proceeds during execution of the program, since most memory leak analysis tools cause a degradation in performance of the JVM application during operation and are therefore unsuited to correcting (or "debugging") memory leaks in a "live" system. Standard "profiler" programs used to detect memory leaks are normally loaded into memory for execution only once during initialization of the JVM program and then remain in memory until operation of the JVM is terminated. However, due to the iterative nature of problem solving, incremental changes in the understanding of the problem will usually require such a profiler to be re-designed and re-coded in several cycles in order to extract the information needed to detect a memory leak, in turn causing multiple undesired "shutdown" and "restart" cycles during operation of the JVM program.

The invention discloses use of the "profiler" as a separate program tool to analyze "heap dumps" for identifying data elements or objects that may have experienced a memory leak, which allows the profiler to be modified and reloaded into memory for execution as necessary without ceasing operation of the JVM program. As a result, the runtime impact on the executed JVM application program is minimal, allowing memory leak analysis to be performed on a "live" system with a minimal degradation in performance.

BRIEF SUMMARY

An invention is disclosed for analyzing memory leaks occurring in Java Virtual Machine (JVM) data storage, consisting of a dynamically modifiable JVM "profiler" and an "object tracker" tool for analyzing the output from the profiler. Specifically, a method and system is disclosed for programming a JVM profiler used to analyze and correct memory leaks in stored data heaps, consisting of a program segment (or "stub") initialized by the JVM interface program to determine the parameters to be passed to the main profiler memory leak analysis program logic, which is then initialized by the stub to examine a minimal number of "heap dumps" in order to identify data elements or objects for the existence and/or correction of memory leaks. The analysis of the heap dumps is performed outside of the JVM being diagnosed and therefore does not affect the execution phases of the JVM program. Updated information on data elements or objects can be requested from the profiler as needed (i.e., 'on demand') by use of the object movement tracking option to record the details of subsequent changes in data memory storage status once a heap dump has been obtained.

It is therefore an object of the present invention to analyze memory leaks occurring in Java Virtual Machine (JVM) data storage through use of a dynamically modifiable JVM profiler and an object tracker tool for analyzing the output from the profiler.

It is another object of the present invention to provide a method and system for programming a JVM profiler used to analyze and correct memory leaks in stored data heaps, consisting of a program segment (or stub) initialized by the JVM program interface to determine the parameters to be passed to the main profiler memory leak analysis program, which is initialized by the stub to examine a number of heap dumps in order to identify data elements or objects for the existence and/or correction of memory leaks.

It is another object of the present invention to request updated information on data elements or objects from the profiler as needed by use of the object movement tracking option to record the details of subsequent changes in data memory storage status once a heap dump has been obtained.

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings.

DETAILED DESCRIPTION

Figure 1:
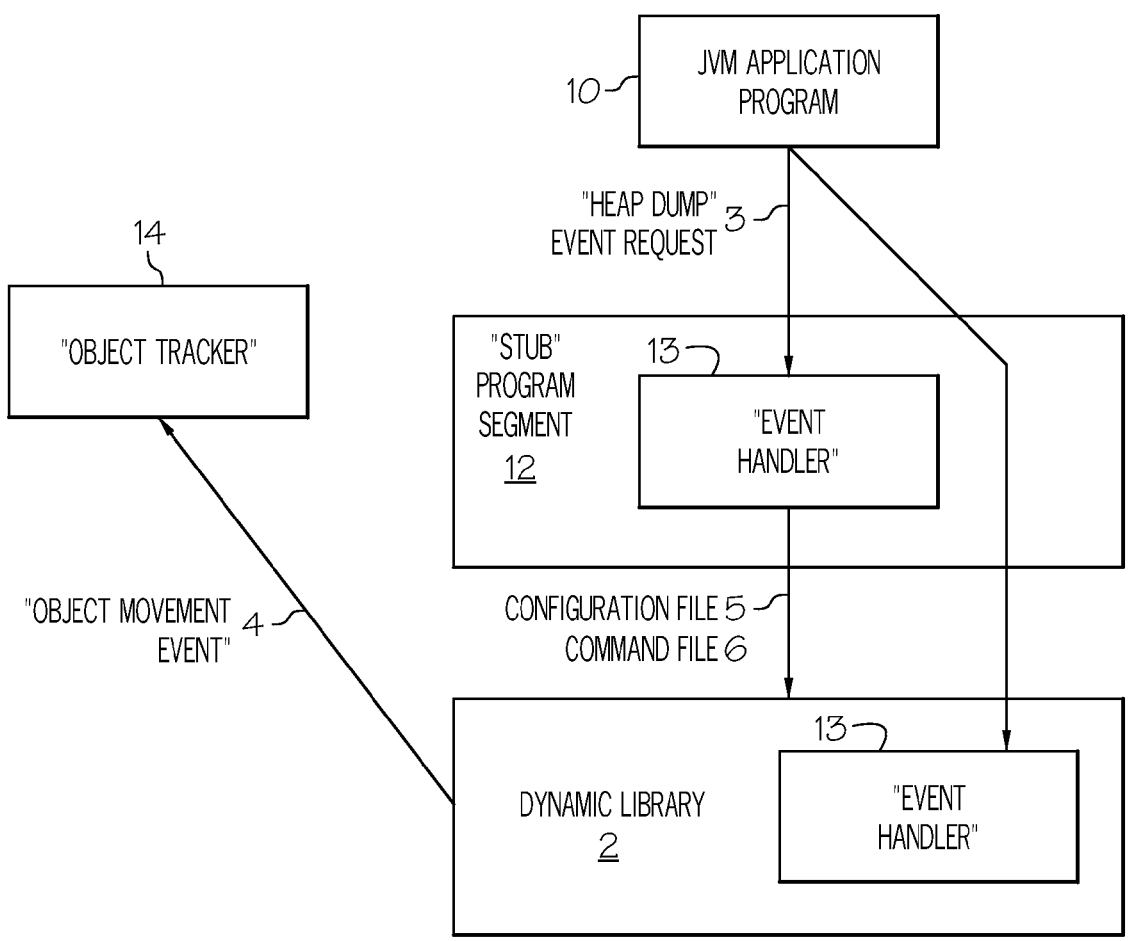
FIG. 1 is a flowchart illustrating the components of the "profiler" of the present invention.
Figure 2:
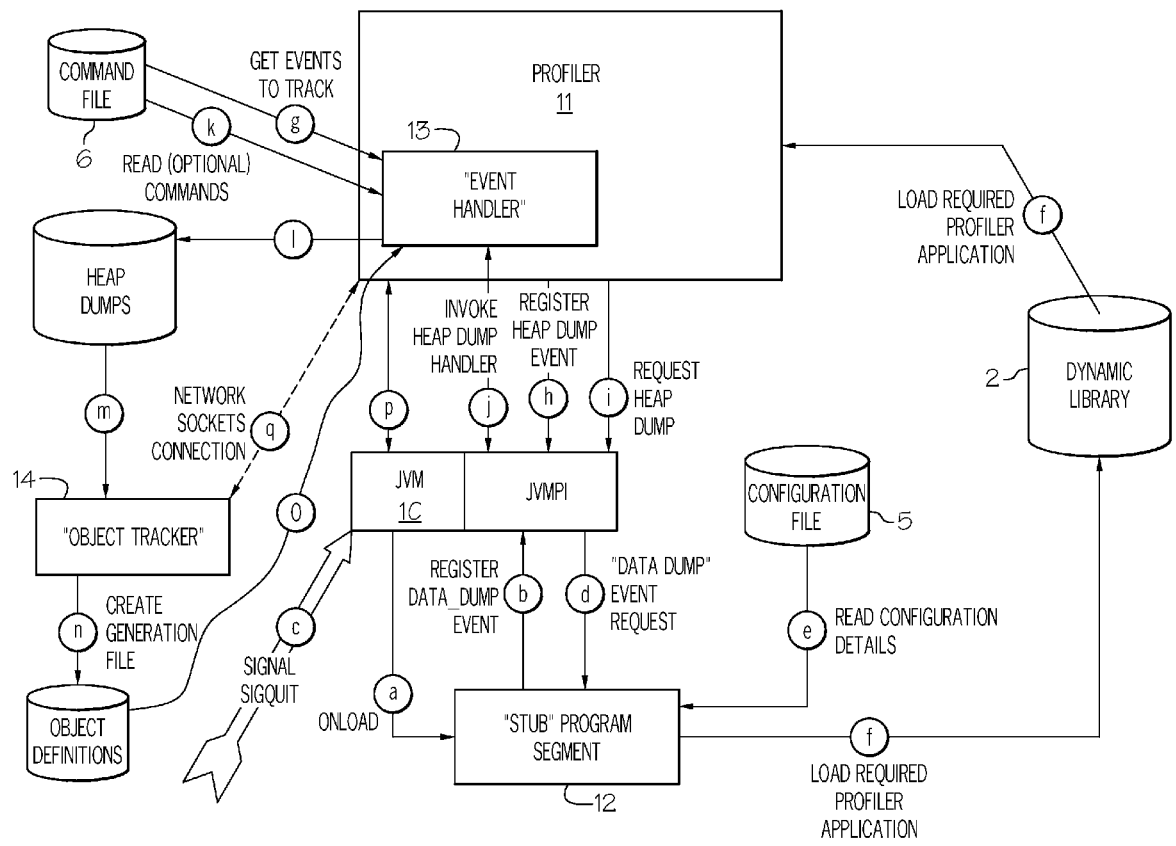
FIG. 2 is a flowchart illustrating operation of the "profiler" of the present invention.

Memory leak analysis is achieved through use of a combination of functions contained in a Java Virtual Machine (JVM) instruction compiler library acting in cooperation with functions packaged in the dynamically modifiable "profiler" program tool. As illustrated in FIG. 1 and in program processing steps "a" through "q" in FIG. 2, a preferred embodiment of the profiler 11 consists of a "stub" program segment 12 loaded by the JVM interface program 10 during initialization (to invoke its "JVM_OnLoad" function) which enables execution of the JVMPI_EVENT_DATA_DUMP_REQUEST (i.e., "heap dump event request") 3 by associating it with an "event handler" 13 that processes the registered event(s) when a SIGQUIT instruction is sent to the JVM program interface 10 to cause passing of the event request to the stub. The event handler 13 of the stub 12 reads the configuration file 5 of the heap dump event request 3 to determine the parameters (including the name and location of the dynamic library 2) to be loaded into memory for execution, with the contents of the configuration file and the dynamic library being capable of modification between processing of successive event requests. Once loaded, control of the dynamic library is passed to the stub 12 which then issues further heap dump event requests 3 as required while first switching the event handler 13 control block to address (or "point to") the dynamic library 2 for obtaining compiled instructions to execute the event request. Upon completed execution of a heap dump event request 3, the event handler 13 is restored to its original state so that the next event request can be processed by the stub 12, while the dynamic library 2 is then removed (or "unloaded") from memory by the stub so that it can be modified (and rebuilt) if required without stopping (and re-starting) operation of the JVM program 10.

The "object tracker" 14 is a multi-tasked/threaded application (preferably programmed in "C" (or a similar programming language that has direct memory management functions) that is used to process the heap dump files created by the heap dump event request(s) 3 (together with the "object movement event" files 4) generated by the stub 12 so that it is possible to track the existence of "surviving" data elements or objects across multiple heap dump files in order to detect memory leakage. (An object that has survived two heap dump events is said to belong to generation "one". Similarly an object surviving three heap dumps is said to belong to generation "two", etc.) The object tracker tool 14 can be instructed to create a list of objects existing in a specified "generation" that can be provided to the profiler 11. The object tracker 14 consists of a configurable memory "cache" of stored object entries for which a "hashing algorithm" can be executed (using the objectID) to find the location in the cache for storing or retrieving an object. (An object is assumed to match another object in the cache if both objects have matching objectIDs and object types.) When a new heap dump file 3 is processed, each object contained in that heap dump is added to the object tracker cache 14 (if it doesn't already exist) and the "generation counter" for each existing entry is incremented. Once the heap dump 3 has been processed, any remaining entries in the object tracker cache 14 (that were not either newly inserted or updated) are removed on the assumption that they are no longer "surviving live" objects to be used by the JVM program 10.

Zero or more object movement events 4 can be processed between processing heap dumps 3. An object movement event file consists of a binary stream of entries each containing the 'Before objectID' and the 'After objectID' of the object(s) that have moved. As each object entry is processed, the object tracker cache 14 is searched for a matching 'Before objectID' indicating its location before movement that is updated with the 'After objectID' of its new location if a match is found. In this manner, "live" objects can be detected when a heap dump is processed (and the generation counter for each can be correctly incremented) if all object movements have been recorded since processing of the previous heap dump, and if all object movement event files 4 have been processed in the same order as their creation.

The idea behind this approach is that the longer an object persists in the object tracker cache 14, the more likely it is to be a "leaking object" that has not been released by the JVM program. To facilitate identification of such leaking objects, the object tracker tool 14 provides a "DUMP_STATS" command identifying the number of program objects belonging to each processing generation. (A generation applies to a group of objects that were added to the object tracker cache during the processing of a heap dump, i.e., if the object continues to exist after execution of the next heap dump then its generation counter is incremented to "1" and if it continues to exist following the next successive heap dump then the generation counter is incremented to "2", etc.) Using the "DUMP_STATS" command in this manner, a specific generation number can be identified and the object tracker 14 can be instructed to write (or "dump") all objects having the required generation number into a single "objectID" file 4. The resulting file can then be provided to the profiler 11 to obtain further details such as the class, size, and/or contents (if a character array) of each object in the file.

Once the dynamic library 2 has been invoked on receipt of a heap dump event request 3, the event handler 13 of the stub 12 uses the configuration file 5 to determine the name and location of an optional profiler command file 6 that provides a mechanism for controlling (and/or changing) execution of the profiler 11 without having to rebuild the library between different instances of program execution. In the absence of a command file, a "type 0 heap dump" is written to an output file, and the output file name is changed by using a fixed "stem" and a numeric sequence for a "suffix" upon each invocation of the "profiler" 11. The functions supported by the command file 6 include:

DUMP_LIVE_OBJECTS:
    [MONITOR_MOVED_OBJECTS=<yes/no>]

This command instructs the profiler 11 to preferably request a "type 0 heap dump" via a JVMPI heap dump event request 3. The contents of any memory buffer location(s) used for the heap dump can be written to a text file containing the data object type and identification (objectID) for each data element or object retrieved during the heap dump. For example, the following list contains four (4) data objects with the first column identifying the object type and the second column providing its objectID (in hexadecimal notation):

| LIST_OBJECTS_WITH_CHECK:OBJECT_LIST=<input object file> [,CATCHUP_MOVED_OBJECTS_VALUE=n] [,DEFAULT_PRINT_BYTES=nnn] | |
|---|---|
| 0 | 44E703A9 |
| 2 | 44E704D9 |
| 5 | 44E70609 |
| 0 | 44E70739 |

This command instructs the profiler 11 to read the specified input file (in the same format as the file output by DUMP_LIVE_OBJECTS 3) and invokes the heap dump event request to obtain further information for each data object specified, including the object class and size and the contents of its character arrays (where its print output length is determined by the DEFAULT_PRINT_BYTES value). The output from this command is written to the next output file in the sequence, while the input list of objects is typically generated as an output from the "object tracker" tool 14.

MONITOR_MOVED_OBJECTS

This command enables object movement event recording, where the stub 12 processes each JVMPI_EVENT_OBJECT_MOVE event 4 by writing the resulting old and new objectIDs to an output stream. This function can also be enabled by specifying the MONITOR_MOVED_OBJECTS option of the DUMP_LIVE_OBJECTS command, which causes object movement recording to be enabled immediately upon a return from JVMPI_EVENT_DATA_DUMP_REQUEST 3 processing, thereby ensuring that data objects contained in the heap dump cannot move without being recorded. The memory useage overhead of this function can be minimized by using a memory buffer that is only occasionally directed (or "flushed") to the output stream, and by writing data in binary format to minimize file sizes. Maximum output file size can be determined using the parameters contained in the configuration file 5 accessed by the stub 12.

```
RETRIEVE_OBJECTS_USING_JNI:OBJECT_LIST
<input object file>, OBJECT_DEFINITIONS=<object definition file>
[,DEFAULT_PRINT_BYTES=nnn]
```

This command provides a way to obtain details about "live" objects (other than character arrays). Such objects are specified in an input file consisting of object type, object ID, object size and object class. All non-primitive object classes (i.e. class type "0") must have their object definition details provided in a separate file denoted by the OBJECT_DEFINITIONS parameter. The following example illustrates an object class named "mjbinternal" which has a string variable and an integer variable ('s' and 'mikesint' respectively):

mjbinternal String,s int,mikesint.

During the processing of the RETRIEVE_OBJECTS_USING_JNI request, the profiler 11 uses the information contained in the object definition file to form JNI requests to extract the variable values held by the specified object(s), which allows the dynamic query of object values during system runtime. The format of the entries in the OBJECT_LIST file is the same as the output format generated by the LIST_OBJECTS_WITH_CHECK command. In the following example two instances of the mjbinternal object class have been listed with each being 20 bytes in size. By providing this information to the profiler 11 with the RETRIEVE_OBJECTS_USING_JNI request, detailed information concerning the object can be extracted:

```
0    00B9C7F8    20    mjbinternal
0    00B9C9F8    20    mjbinternal
```

Successful execution of this command provides an output file containing the variable values for the specified objects:

```
DUMP_WITH_DETAILS
00B9C7F8
    Field 's' value: Some string value
    Field 'mikesint' value: 44
00B9C9F8
    Field 's' value: Another string value
    Field 'mikesint' value: 55
```

This command generates an output heap dump file 3 containing a list of all "live" objects together with the type, size and class name for each one. For character arrays, the first n bytes of the array are also output (where the value of n is configurable). An example output is shown below:

```
56     java.net.URL
272    [char 128      "file:/iws/v01/opt/IBM/WebSphereICS/jre/lib/
                       endorsed/xml.jar!/..."
24     java.lang.String
200    [char 94       "file:/iws/v01/opt/IBM/WebSphereICS/jre/
                       lib/endorsed/xml.jar........"
24     [char
48     java.util.jar.JarFile
32     java.lang.ref.Finalizer
24     java.util.Vector
56     [java.lang.Object
40     java.util.zip.Inflater
32     java.lang.ref.Finalizer
528    [byte
24     java.util.HashMap$Entry
272    [char 130      "file:/iws/v01/opt/IBM/WebSphereICS/jre/
                       lib/endorsed/xml.jar!/ME"
40     java.util.HashMap
80     [java.util.HashMap$Entry
```

The object tracker tool 14 can be optimized to automatically process a sequence of input files, for example:

```
heap.dump.2
heap.dump.4
objMov.3-2
objMov.2-1
objMov.3-1
heap.dump.1
objMov.2-2
objMov.3-3
heap.dump.3
objMov.1-1
objMov.2-2
objMov.4-1
```

The object tracker 14 supports a range of commands designed to simplify the analysis process, including CACHE_AND_MOVE_MULTIPLE_OBJECTS whereby each file will be processed in the following order when executing the example command CACHE_AND_MOVE_MULTIPLE_OBJECTS, heap.dump,objectMov,1:

```
heap.dump.1
    objMov.1-1
heap.dump.2
    objMov.2-1
    objMov.2-2
heap.dump.3
    objMov.3-1
    objMov.3-2
```

-continued

```
        objMov.3-3
    heap.dump.4
        objMov.4-1
```

Under this instruction, the object tracker 14 will terminate the processing of object movement event files 4 when it determines that "objMov.4-2" does not exist, and it will stop processing heap dump event request(s) 3 when it determines that "heap.dump.5" does not exist.

While certain preferred features of the invention have been shown by way of illustration, many modifications and changes can be made that fall within the true spirit of the invention as embodied in the following claims, which are to be interpreted as broadly as the law permits to cover the full scope of the invention, including all equivalents thereto.

What is claimed is:

1. A method, comprising:
   receiving, at a heap dump request processing module, a plurality of heap dump requests associated with an operating virtual machine (VM) program from a VM profiler interface module;
   in response to receipt of each heap dump request at the heap dump request processing module:
      loading a dynamic modifiable library identified within a dynamic modifiable configuration file into a memory, where the dynamic modifiable library comprises instructions associated with processing a current heap dump request;
      executing the instructions associated with processing the current heap dump request; and
      unloading the dynamic modifiable library from the memory;
   analyzing a plurality of heap dump files and a plurality of object movement event files generated by execution of the instructions; and
   automatically identifying a memory leak associated with the operating VM program based upon the analyzed plurality of heap dump files and the plurality of object movement event files.

2. The method of claim 1, where executing the instructions associated with processing the current heap dump request comprises:
   generating one of the plurality of heap dump files, each associated with one of the plurality of heap dump requests, and where each of the plurality of heap dump files comprises memory objects previously allocated by the operating VM program; and
   generating, beginning with a second of the plurality of heap dump requests, one of the plurality of object movement event files that identifies memory objects associated with the operating VM program moved within the memory relative to a previous heap dump request.

3. The method of claim 1, where executing the instructions associated with processing the current heap dump request comprises:
   switching an event handler control block to point to the loaded dynamic modifiable library;
   obtaining compiled instructions from the loaded dynamic modifiable library, where the obtained compiled instructions indicate to issue additional heap dump requests; and
   issuing, via the heap dump request processing module, the additional heap dump requests.

4. The method of claim 3, further comprising restoring the event handler control block to point to the heap dump request processing module upon completion of issuing, via the heap dump request processing module, the additional heap dump requests.

5. The method of claim 1, further comprising changing at least one of the dynamic modifiable library and the dynamic modifiable configuration file between at least two of the plurality of heap dump requests.

6. The method of claim 1, where automatically identifying a memory leak associated with the operating VM program based upon the analyzed plurality of heap dump files and the plurality of object movement event files comprises automatically identifying the memory leak without requiring multiple shutdown and restart actions of the operating VM program.

7. The method of claim 1, where executing the instructions associated with processing the current heap dump request comprises:
   determining whether each memory object within each of the plurality of heap dump files exists within an object tracker cache;
   adding each memory object within each of the plurality of heap dump files determined not to exist within the object tracker cache to the object tracker cache; and
   incrementing a generation counter for each of the memory objects determined to exist within the object tracker cache.

8. The method of claim 7, where automatically identifying a memory leak associated with the operating VM program based upon the analyzed plurality of heap dump files and the plurality of object movement event files comprises automatically identifying a memory object within the object tracker cache with a generation counter associated with the memory object of at least a specific generation number.

9. A system, comprising:
   a memory; and
   a processor programmed to execute a heap dump request processing module and to:
      receive a plurality of heap dump requests associated with an operating virtual machine (VM) program from a VM profiler interface module;
      in response to receipt of each heap dump request:
         load a dynamic modifiable library identified within a dynamic modifiable configuration file into the memory, where the dynamic modifiable library comprises instructions associated with processing a current heap dump request;
         execute the instructions associated with processing the current heap dump request; and
         unload the dynamic modifiable library from the memory;
      analyze a plurality of heap dump files and a plurality of object movement event files generated by execution of the instructions; and
      automatically identify a memory leak associated with the operating VM program based upon the analyzed plurality of heap dump files and the plurality of object movement event files.

10. The system of claim 9, where, in being programmed to execute the instructions associated with processing the current heap dump request, the processor is programmed to:
    generate one of the plurality of heap dump files, each associated with one of the plurality of heap dump requests, and where each of the plurality of heap dump files comprises memory objects previously allocated by the operating VM program; and
    generate, beginning with a second of the plurality of heap dump requests, one of the plurality of object movement event files that identifies memory objects associated with the operating VM program moved within the memory relative to a previous heap dump request.

11. The system of claim 9, where, in being programmed to execute the instructions associated with processing the current heap dump request, the processor is programmed to:
   switch an event handler control block to point to the loaded dynamic modifiable library;
   obtain compiled instructions from the loaded dynamic modifiable library, where the obtained compiled instructions indicate to issue additional heap dump requests; and
   issue the additional heap dump requests.

12. The system of claim 11, where the processor is further programmed to restore the event handler control block to point to the heap dump request processing module upon completion of issuing the additional heap dump requests.

13. The system of claim 9, where the processor is further programmed to change at least one of the dynamic modifiable library and the dynamic modifiable configuration file between at least two of the plurality of heap dump requests.

14. The system of claim 9, where, in being programmed to automatically identify a memory leak associated with the operating VM program based upon the analyzed plurality of heap dump files and the plurality of object movement event files, the processor is programmed to automatically identify the memory leak without requiring multiple shutdown and restart actions of the operating VM program.

15. The system of claim 9, where, in being programmed to execute the instructions associated with processing the current heap dump request, the processor is programmed to:
   determine whether each memory object within each of the plurality of heap dump files exists within an object tracker cache;
   add each memory object within each of the plurality of heap dump files determined not to exist within the object tracker cache to the object tracker cache; and
   increment a generation counter for each of the memory objects determined to exist within the object tracker cache.

16. The system of claim 15, where, in being programmed to automatically identify a memory leak associated with the operating VM program based upon the analyzed plurality of heap dump files and the plurality of object movement event files, the processor is programmed to automatically identify a memory object within the object tracker cache with a generation counter associated with the memory object of at least a specific generation number.

17. A computer program product comprising a non-transitory computer readable storage medium including computer readable program code, where the computer readable program code when executed on a computer causes the computer to:
   receive a plurality of heap dump requests associated with an operating virtual machine (VM) program from a VM profiler interface module;
   in response to receipt of each heap dump request:
      load a dynamic modifiable library identified within a dynamic modifiable configuration file into the memory, where the dynamic modifiable library comprises instructions associated with processing a current heap dump request;
      execute the instructions associated with processing the current heap dump request; and
      unload the dynamic modifiable library from the memory;
   analyze a plurality of heap dump files and a plurality of object movement event files generated by execution of the instructions; and
   automatically identify a memory leak associated with the operating VM program based upon the analyzed plurality of heap dump files and the plurality of object movement event files.

18. The computer program product of claim 17, where, in causing the computer to execute the instructions associated with processing the current heap dump request, the computer readable program code when executed on the computer causes the computer to:
   generate one of the plurality of heap dump files, each associated with one of the plurality of heap dump requests, and where each of the plurality of heap dump files comprises memory objects previously allocated by the operating VM program; and
   generate, beginning with a second of the plurality of heap dump requests, one of the plurality of object movement event files that identifies memory objects associated with the operating VM program moved within the memory relative to a previous heap dump request.

19. The computer program product of claim 17, where, in causing the computer to execute the instructions associated with processing the current heap dump request, the computer readable program code when executed on the computer causes the computer to:
   switch an event handler control block to point to the loaded dynamic modifiable library;
   obtain compiled instructions from the loaded dynamic modifiable library, where the obtained compiled instructions indicate to issue additional heap dump requests; and
   issue the additional heap dump requests.

20. The computer program product of claim 19, where the computer readable program code when executed on the computer further causes the computer to restore the event handler control block to point to the heap dump request processing module upon completion of issuing the additional heap dump requests.

21. The computer program product of claim 17, where the computer readable program code when executed on the computer further causes the computer to change at least one of the dynamic modifiable library and the dynamic modifiable configuration file between at least two of the plurality of heap dump requests.

22. The computer program product of claim 17, where, in causing the computer to automatically identify a memory leak associated with the operating VM program based upon the analyzed plurality of heap dump files and the plurality of object movement event files, the computer readable program code when executed on the computer causes the computer to automatically identify the memory leak without requiring multiple shutdown and restart actions of the operating VM program.

23. The computer program product of claim 17, where, in causing the computer to execute the instructions associated with processing the current heap dump request, the computer readable program code when executed on the computer causes the computer to:
   determine whether each memory object within each of the plurality of heap dump files exists within an object tracker cache;
   add each memory object within each of the plurality of heap dump files determined not to exist within the object tracker cache to the object tracker cache; and increment a generation counter for each of the memory objects determined to exist within the object tracker cache.

24. The computer program product of claim 23, where, in causing the computer to automatically identify a memory leak associated with the operating VM program based upon the analyzed plurality of heap dump files and the plurality of object movement event files, the computer readable program code when executed on the computer causes the computer to automatically identify a memory object within the object tracker cache with a generation counter associated with the memory object of at least a specific generation number.

* * * * *